US006421873B1

(12) United States Patent
Zimmer

(10) Patent No.: US 6,421,873 B1
(45) Date of Patent: Jul. 23, 2002

(54) WIPER SUPPORT

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/403,348

(22) PCT Filed: Feb. 18, 1999

(86) PCT No.: PCT/DE99/00443

§ 371 (c)(1), (2), (4) Date: Oct. 19, 1999

(87) PCT Pub. No.: WO99/42345

PCT Pub. Date: Aug. 26, 1999

(30) Foreign Application Priority Data

Feb. 19, 1998 (DE) ........................................ 198 06 855

(51) Int. Cl.[7] .................................................. B60S 1/06

(52) U.S. Cl. ...................... 15/250.3; 15/250.31; 74/42; 296/96.17; 248/900

(58) Field of Search .......................... 15/250.3, 250.31, 15/250.27, 250.14; 296/96.15, 96.17, 192; 248/900, 901; 74/42, 43

(56) References Cited

U.S. PATENT DOCUMENTS 5,142,941 A * 9/1992 Amann et al. ............ 15/250.3

FOREIGN PATENT DOCUMENTS

| | | | | |
|---|---|---|---|---|
| DE | 74 34 119 | | 2/1975 | |
| DE | 19540869 | * | 6/1996 | |
| EP | 694455 | * | 1/1996 | |
| GB | 2219932 | * | 12/1989 | ............... 15/250.3 |

* cited by examiner

*Primary Examiner*—Gary K. Graham
(74) *Attorney, Agent, or Firm*—Michael J. Striker

(57) ABSTRACT

A wiper bracket (10) with a hollow profile (64, 72, 74) is provided for fastening a wiper motor, via a motor receptable (24), and at least one wiper bearing (12, 14) for fastening a windshield wiper to a vehicle body. A longitudinally elastically resilient region (60, 62) is disposed between the motor receptacle (24) and the wiper bearing (12, 14).

9 Claims, 4 Drawing Sheets

WIPER SUPPORT

BACKGROUND OF THE INVENTION

The present invention relates to a wiper bracket for fastening a wiper motor and a wiper bearing for a windshield wiper to the body of a motor vehicle.

Motor vehicle wiper systems are secured to the body of a motor vehicle with a wiper bracket, or so-called elbow plate. The elbow plate has a wiper drive with a wiper motor, whose motor shaft, via connecting rods, drives cranks that are solidly connected to a drive shaft for each window wiper. The drive shaft is supported in a wiper bearing, whose bearing housing is secured to the elbow plate. The wiper bracket is secured directly to a vehicle body via the wiper bearings or via fastening eyelets that are formed onto the wiper bearing, the wiper bracket, and/or a motor bracket.

From German Utility Model DE-U 74 34 119, a wiper bracket is known that is made from a square pipe or tube to which a plate acting as a motor bracket is welded. Such wiper brackets, often also called tubular elbow plates or tubular frame systems, are distinguished by lightweight construction with great stability. For cost reasons, a straight tube is desired, because it requires no preliminary bending operation. The straight version of the tube has high rigidity in the axial direction, which does have a favorable effect in normal wiper system operation, but in the event of a blockage or when there is snow on the window has disadvantages, because the other components of the wiper system, such as the wiper bearings or wiper levers, are heavily loaded, because the tube has such low elasticity. These other components must therefore be reinforced. The attendant higher costs cancel out the cost advantage of the straight tube or make it even more expensive then the alternative.

A wi is also known from European Patent disclosure EP B1 0 409 944, in which tubular elements connect a motor bracket to the wiper bearings via positive-engagement connections. Noise-damping, frequency-filtering or noise absorbing adapters are inserted into the essentially straight tubular elements in order to damp noises that are transmitted from the wiper motor via the wiper bracket to the wiper bearings and then to the vehicle body. A variant shows that the tubular wiper bracket is perforated in one region and filled with a noise-absorbing material, which may be foam. In all these provisions, care must be taken not to reduce the stability of the bracket frame excessively.

A method for reshaping tubes into workpieces is also known from the journal “Werkstatt und Betrieb” Shop and Factory, Carl Hanser Verlag, Munich, 1995, pages 812–815, and the of print from the journal “Metallumformtechnik” Metal Reshaping Technology, Claus Dannert Verlag, 1994, entitled “Präzisions-Werkstücke in Leichtbauweise, hergestellt durch Innenhochdruck-Umformen” Lightweight precision workpieces, made by internal-high-pressure reshaping. This method, which is used above all for the automotive industry, employs high pressures. The tubular piece to be reshaped is placed in a split molding tool, into which the desired workpiece shape is machined. The molding tool, which is mounted in a press, is closed by a press slide that operates vertically. The ends of the tubular piece are closed by closing tools, through which a pressure medium is delivered that presses the walls of the tube against the internal tool shape. An axial pressure is exerted on the tube by horizontally acting slides, and this axial pressure is superimposed on the internal pressure. Thus the material that is required for the reshaping is taken not only from the wall thickness of the tubular piece but is also made available by the shortening of the tube. The closing tools are axially fed during the reshaping. Employing such a method for producing a tubular wiper bracket with different cross-sectional shapes is also the subject of an earlier patent application.

SUMMARY OF THE INVENTION

According to the invention, the wiper bracket has a longitudinally elastically resilient region between the motor receptacle and the wiper bearing; this region is expediently formed in that the hollow profile in this region has alternating portions with a smaller and a larger diameter. If the flexural strength of the wiper bracket is reduced by this provision, then this can be compensated for according to a feature of the invention in that the mean diameter in the elastically resilient region is increased compared with the diameter in the adjacent regions. The mean diameter is defined as the arithmetic mean between the larger and the smaller diameters. It is essential that the resistance moment, which is decisive for the flexural strength, be increased by an increased outer contour, but without increasing the wall thickness that is definitive for the axial elasticity. The same is true for tubular profiles with a nonround cross section as well.

Because the rigidity in the axial direction is reduced, the peak load in the wiper arm and wiper bearing in the event of blockage or snow on the window is reduced. This applies above all in the region of the parking position and the reversal point of the wiper arm, or the extended and covering position between the crank of the wiper motor and a connecting rod. Since the components subjected to less stress can be smaller in size, there are savings in terms of cost and weight.

Disadvantages that might possibly arise from reduced flexural strength of the axially elastically resilient region can also be overcome by providing that this region is disposed in a portion of the hollow profile that is subjected to only little bending stress. Such regions are formed by straight portions of the hollow profile, which extend essentially parallel to a connecting rod and thus above all absorb tensile and compressive forces.

As a rule, elastically resilient regions will be provided on both sides of the wiper motor. Often, however, it will suffice to dispose an axially elastic region on only the passenger side of the wiper motor. As a result, the wiping quality on the driver’s side is not impaired by the axial elasticity, and nevertheless the components are largely protected against an overload.

The different diameters can expediently be achieved by means of a pressing operation or an internal-high-pressure reshaping process. By pressing, in general only indentations can be made, by which the mean diameter in this region is reversed, but by the internal-high-pressure reshaping process, the diameter of the high-profile can be widened, so that the hollow profile of the wiper bracket can be widened in the region of the alternating diameters and thus gains a higher resistance moment and at the same time a greater axial elasticity.

BRIEF DESCRIPTION OF THE DRAWINGS

Further advantages will become apparent from the ensuing drawing description. In the drawing, exemplary embodiments of the invention are shown. The drawing, description and claims include numerous characteristics in combination. One skilled in the art will expediently consider each of the characteristics individually as well and make appropriate further combinations of them.

Shown are.

DETAILED DESCRIPTION OF THE PREFERRED EMBODIMENTS

Figure 1:
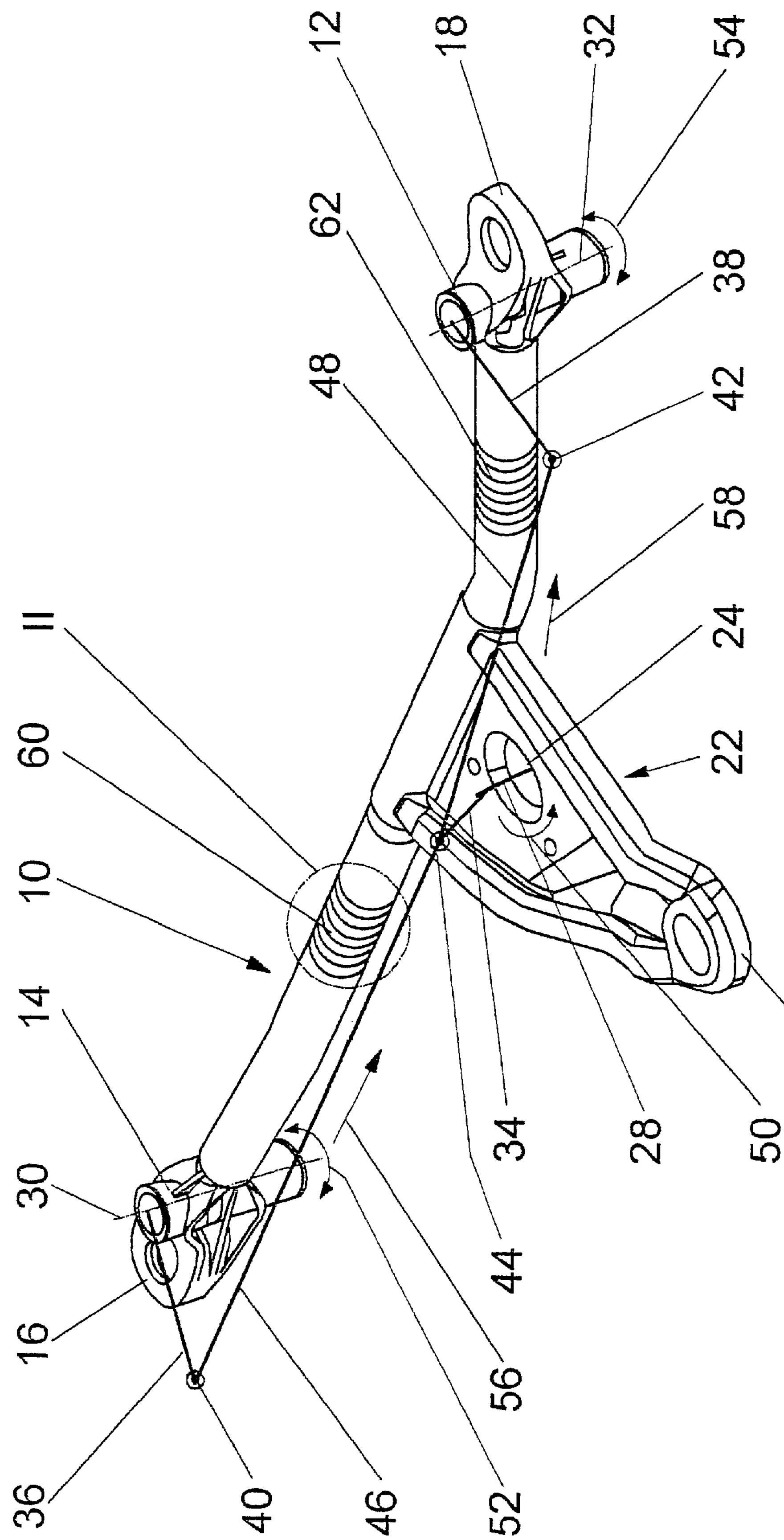
FIG. 1, a perspective view of a wiper bracket.

A wiper bracket 10, in an embodiment with hollow profiles 64, 72, 74, also known as a tubular elbow plate or tubular frame, joins together two wiper bearings 12, 14 secured to its ends and a motor bracket 22 disposed between them. On the wiper bearings 12, 14 and on the motor bracket 22, fastening eyelets 16, 18, 20 are provided, with which the wiper bracket 10 is secured to a vehicle body, not shown in further detail.

A wiper drive, which essentially comprises a motor shaft 28, cranks 34, 36, 38, connecting rods 46, 48, and drive shafts 30, 32 for a window washer, not shown, is schematically indicated by dashed lines. A wiper motor, to which the motor shaft 28 belongs, is held on the motor bracket 22 via a motor receptacle 24 and drives the connecting rods 46 and 48 by way of its motor shaft 28 and the cranks 34. The connecting rods 46 and 48 are connected via a joint 44 to the crank 34 of the motor shaft 28 and via further joints 40 and 42 on the other ends to the cranks 36 and 38, respectively, which are secured to the drive shafts 30 and 32. The direction of rotation 50 of the motor shaft 28 and the swiveling directions 52, 54 are indicated by arrows.

During the wiping motion of the window wiper, tensile and compressive forces, which are supported via the wiper bracket 10, act on the connecting rods 46, 48 in the force regions 56 and 58. If the window wiper is blocked by snow or otherwise, considerable peak loads occur, which have to be absorbed by the components, such as the wiper bearings 12, 14 and the wiper arms, not shown, mounted on the drive shafts 30, 32. These components must be dimensioned with special strength to suit the maximum loads to be expected. To reduce the peak loads, axially elastically resilient regions 60 and 62 are provided on both sides of the motor bracket 22; in the event of blockage, they deform axially elastically and thus reduce the peak load. The axially elastically resilient regions 60 and 62 are expediently disposed in straight regions of the wiper bracket 10 that experience only slight bending moments and that extend essentially parallel to the connecting rods 46, 48.

As a rule, the elastic regions 60 and 62 are provided on both sides of the motor bracket 22. In many cases, however, one elastic region 60 on one side of the motor bracket 22 will suffice. That region should then expediently be located on the passenger side of the vehicle, so as to preclude impairment of the wiping quality on the driver's side of the vehicle during normal operation that could possibly occur from the greater elasticity.

Figure 2:
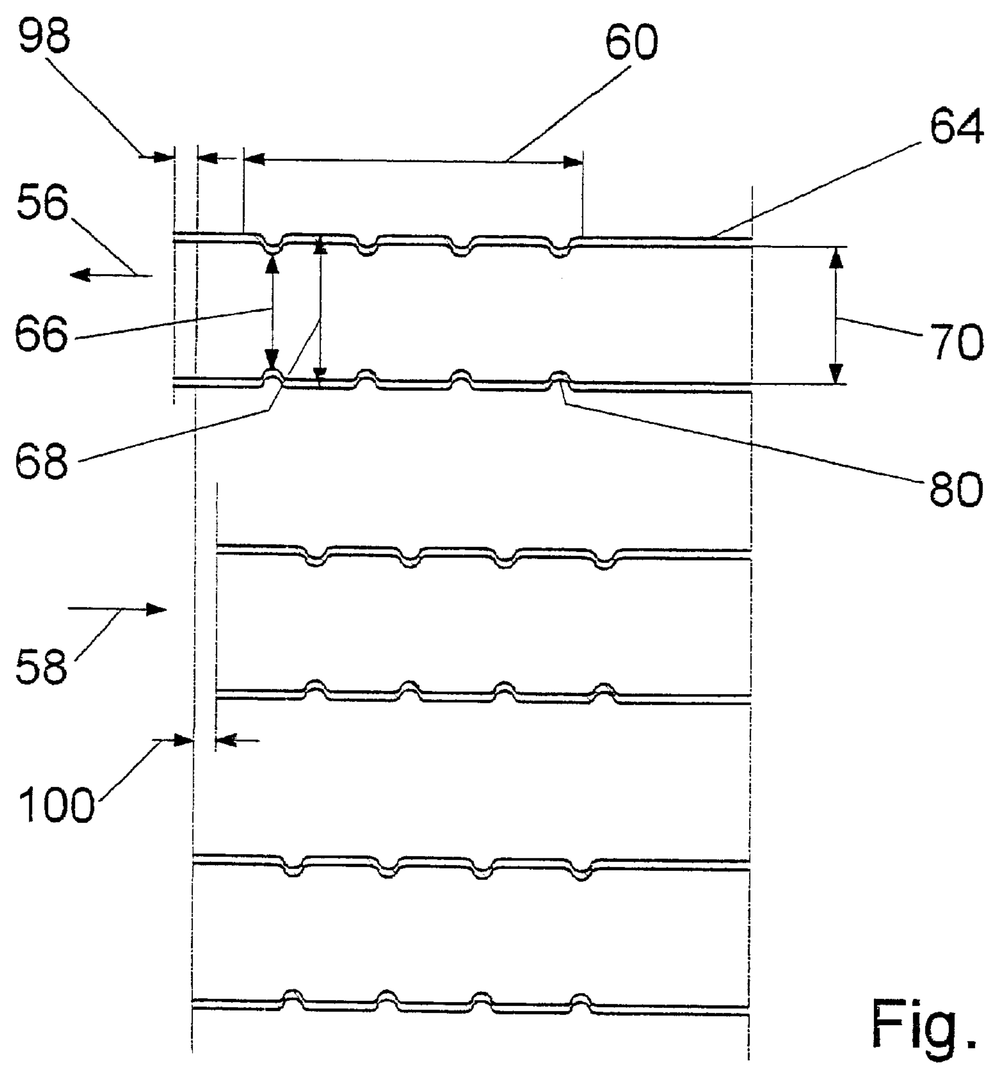
FIG. 2, an enlarged longitudinal section through a longitudinally elastically resilient region II in FIG. 1.

FIG. 2 shows a hollow profile 64 with the elastically axially resilient region 60, in which portions with a smaller diameter 66 alternate with portions of a greater diameter 68. The hollow profile is devoid of obstructions therein. The portions with the smaller diameter 66 are formed by beads 80 which are pressed into the hollow profile 84. The portions with the larger diameter 68 correspond to the diameter 70 of the adjacent region, compared to which the mean diameter of the elastic region 60, resulting from the larger diameter 68 and the smaller diameter 66, is reduced. The upper part of FIG. 2 shows how the region 60 lengthens elastically, under the influence of a tensile force 56, by a distance 98, while the middle part undergoes an elastic shortening by a distance 100 under the influence of a compressive force 58. The lower part shows the region 60 without any load.

Figure 3:
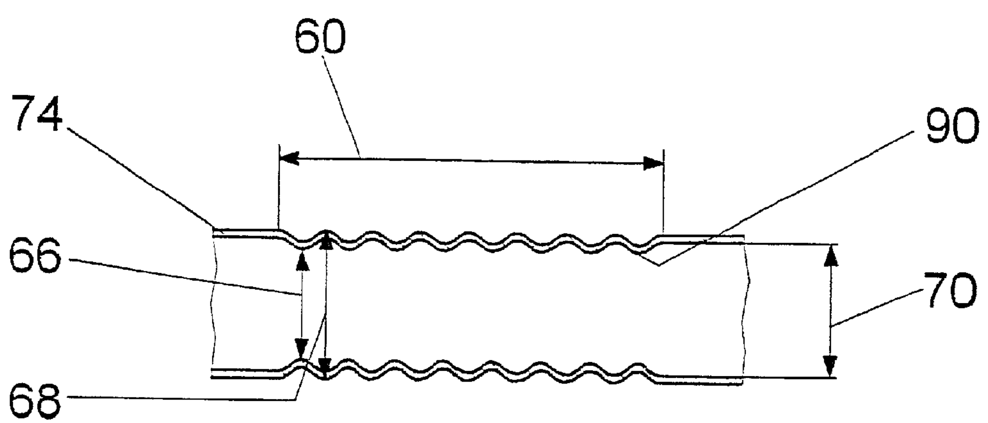
FIG. 3, a variant of FIG. 2.
Figure 4:
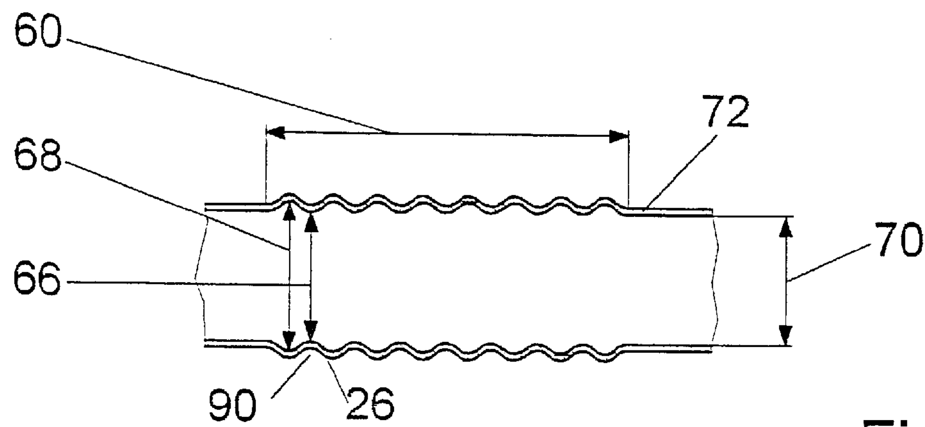
FIG. 4, a variant of FIG. 3.
Figure 5:
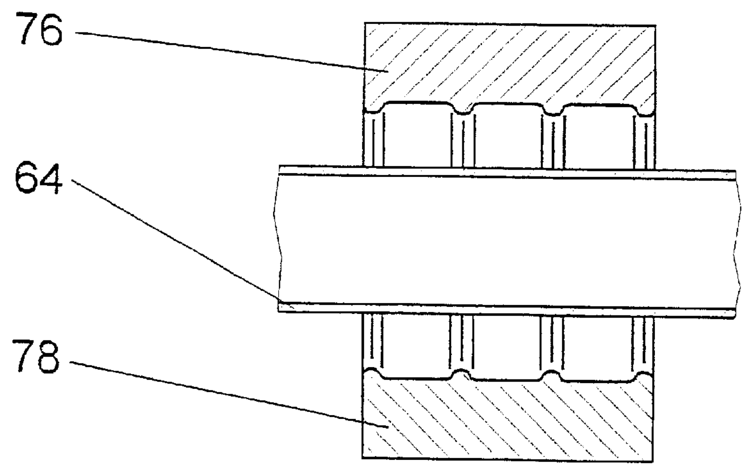
FIG. 5, a fragmentary section through an opened pressing die for producing an elastically resilient region.
Figure 6:
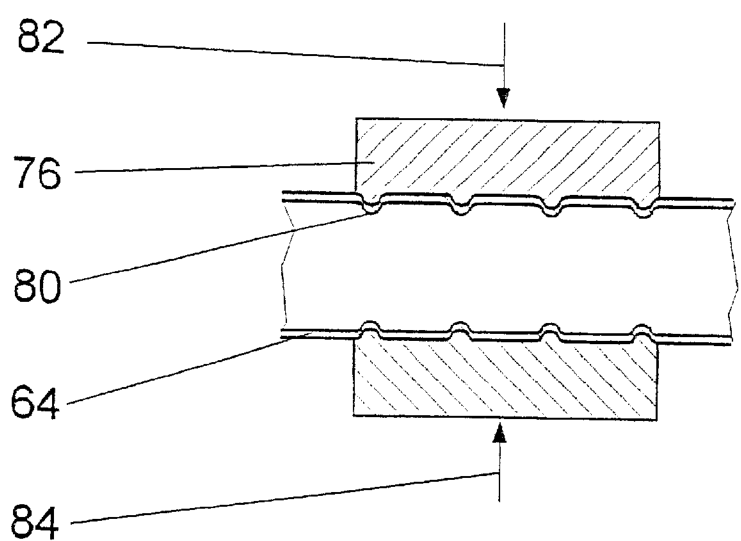
FIG. 6, a fragmentary section through a closed pressing die of FIG. 5.
Figure 7:
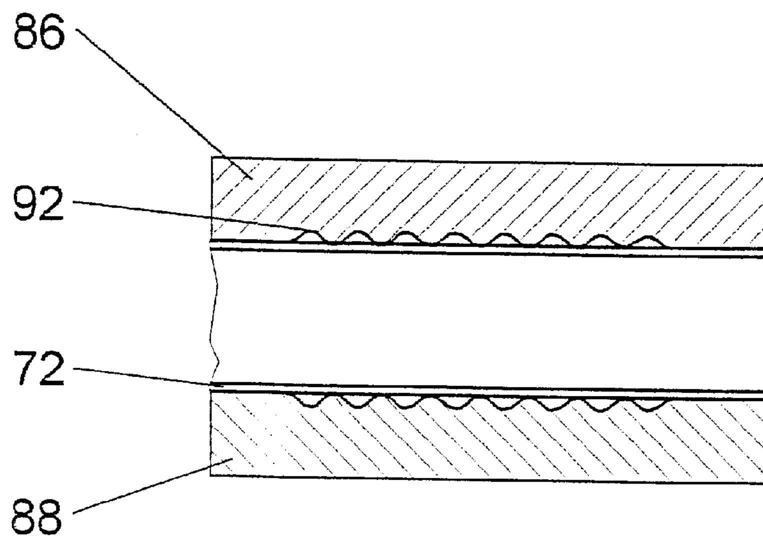
FIG. 7, a fragmentary section through an opened molding tool for producing an elastically resilient region by the internal-high-pressure reshaping method.

In the versions of FIGS. 3 and 4, the elastically resilient regions 60 are formed by a corrugated tube; indentations 90 are pressed in (FIG. 3) or protuberances 26 are deformed outward (FIG. 4), in each case beginning at a diameter 70. The beads 80 and the indentations 90 can be made in the hollow profiles 64, 74 in a simple way by a pressing process. FIG. 5 shows an opened pressing form with an upper pressing die 76 and a lower pressing die 78. Under the influence of the pressing forces 82 and 84, the pressing tool 76, 78 is closed (FIG. 6), and the beads 80 are thus formed into the hollow profile 64. A corrugated tube can be made with a suitable tool in the same way.

Figure 8:
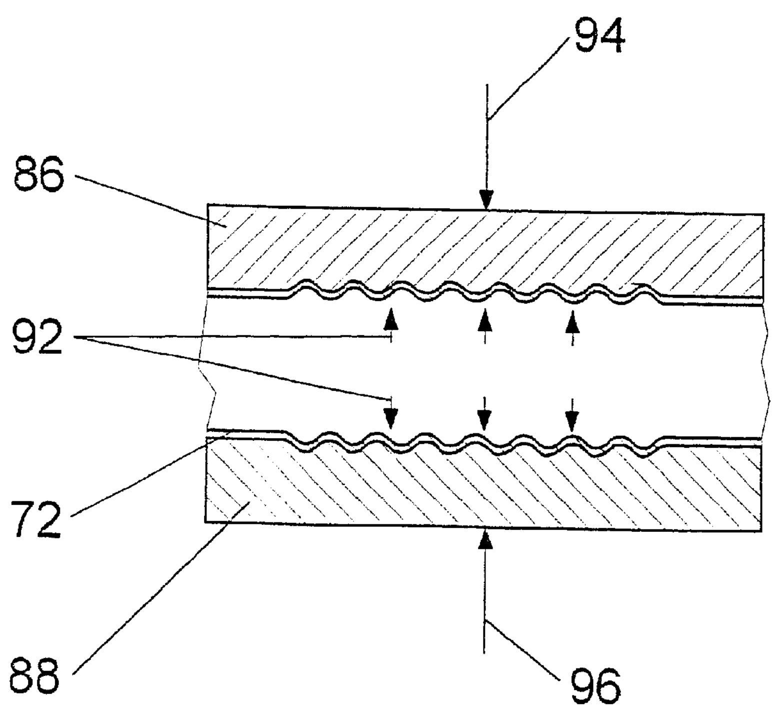
FIG. 8, a fragmentary section through a closed molding tool of FIG. 7.

If the protuberances 26 extend past the diameter 70 of the adjacent part of the hollow profile 72, then an internal-high-pressure reshaping method is expediently employed. In it, the hollow profile 72 is placed in a molding tool 86, 88, whose upper molding tool 86 and lower molding tool 88 are closed by closing forces 94 and 96 and then kept closed. In order to form the molding tool from the inside by means of compressive forces 92, the hollow profile 72 is subjected to a pressure medium (FIG. 8). As a result, diameters 66, 68 can be obtained in the elastically deformable region that produce a larger mean diameter than the diameter 70 in the adjacent regions, so that a higher resistance moment with a greater flexural strength is attained. As a result, despite a greater axial elasticity, the flexural strength can be kept the same or even increased.

LIST OF REFERENCE NUMERALS

10 Wiper bracket
12 Wiper bearing
14 Wiper bearing
16 Fastening eyelet
18 Fastening eyelet
20 Fastening eyelet
22 Motor bracket
24 Motor receptacle
26 Protuberance
28 Motor shaft
30 Drive shaft
32 Drive shaft
34 Crank
36 Crank
38 Crank
40 Joint
44 Joint
46 Connecting rod
48 Connecting rod
50 Direction of rotation
52 Swiveling direction
54 Swiveling direction
56 Force direction
58 Force direction
60 Elastic region

62 Elastic region
64 Hollow profile
66 Small diameter
68 Large diameter
70 Diameter
72 Hollow profile
74 Hollow profile
76 Upper pressing die
78 Lower pressing die
80 Bead
82 Pressing force
84 Pressing force
86 Upper molding tool
88 Lower molding tool
90 Indentations
92 Compressive force
94 Closing force
96 Closing force
98 Distance
100 Distance

What is claimed is:

1. A wiper bracket (10), having a hollow profile (64, 72, 74) for fastening a wiper motor, via a motor receptacle (24), and at least one wiper bearing (12, 14) for a windshield wiper to a vehicle body, characterized in that a longitudinally elastically resilient region (60, 62) is disposed in said hollow profile between the motor receptacle (24) and the wiper bearing (12, 14) and is devoid of any obstruction therein.

2. The wiper bracket (10) of claim 1, characterized in that the hollow profile (64, 72, 74), in the region (60, 62), has alternating portions with a smaller diameter (66) and a larger diameter (68).

3. The wiper bracket (10) of claim 1, characterized In that a flexibility, reduced by alternating diameters (66, 68), is compensated for by a mean diameter in the elastically resilient region (60, 62) that is increased compared with a diameter (70) in regions adjacent to said elastically resilient region.

4. The wiper bracket (10) of claim 1 characterized in that a wiper bearing (12, 14) and an elastically resilient region (60, 62) are provided on both sides of the motor receptacle (24).

5. The wiper bracket (10) of claim 1, characterized in that a wiper bearing (12, 14) is disposed on both sides of the motor receptacle (25), but an elastically resilient region (62) is provided only on a passenger side.

6. The wiper bracket (10) of claim 1, characterized in that the resilient region is disposed in a portion of the hollow profile (64, 72, 74) that is only slightly subjected to bending stress.

7. The wiper bracket (10) of claim 6, characterized in that the resilient region (60, 62) is disposed in a straight portion of the hollow profile (64, 72, 74), and further comprising a wiper drive including at least one connecting rod and a motor shaft having a wiper motor, said wiper motor driving said at least one connecting rod, wherein said portion extends substantially parallel to one of said at least one connecting rod (46, 48).

8. The wiper bracket (10) of claim 1 characterized in that the hollow profile (64, 72, 74) is deformed by pressing in the elastically resilient region (60, 62).

9. The wiper bracket (10) of claim 1 characterized in that the hollow profile (64, 72, 74), in the elastically resilient region (60, 62), is produced by an internal high-pressure reshaping process.

* * * * *